United States Patent [19]

Cheong et al.

[11] Patent Number: 5,692,151
[45] Date of Patent: Nov. 25, 1997

[54] HIGH PERFORMANCE/LOW COST ACCESS HAZARD DETECTION IN PIPELINED CACHE CONTROLLER USING COMPARATORS WITH A WIDTH SHORTER THAN AND INDEPENDENT OF TOTAL WIDTH OF MEMORY ADDRESS

[75] Inventors: Hoichi Cheong, Austin; Dwain A. Hicks, Pflugerville; Kimming So, Austin, all of Tex.

[73] Assignee: International Business Machines Corporation, Armonk, N.Y.

[21] Appl. No.: 337,715

[22] Filed: Nov. 14, 1994

[51] Int. Cl.⁶ .................................................. G06F 12/08
[52] U.S. Cl. .................................... 395/467; 395/468
[58] Field of Search ............................ 395/467, 468, 395/496

[56] References Cited

U.S. PATENT DOCUMENTS

| | | | |
|---|---|---|---|
| 4,620,275 | 10/1986 | Wallach et al. | 395/800 |
| 4,670,836 | 6/1987 | Kubo et al. | 395/496 |
| 4,750,112 | 6/1988 | Jones et al. | 395/393 |
| 4,760,519 | 7/1988 | Papworth et al. | 395/393 |
| 4,777,594 | 10/1988 | Jones et al. | 395/587 |
| 4,812,972 | 3/1989 | Chastain et al. | 395/387 |
| 4,926,317 | 5/1990 | Wallach et al. | 395/403 |
| 5,155,817 | 10/1992 | Kishigami et al. | 395/394 |
| 5,208,914 | 5/1993 | Wilson et al. | 395/859 |
| 5,475,824 | 12/1995 | Grochowski et al. | 395/382 |
| 5,564,034 | 10/1996 | Miyake | 395/455 |

OTHER PUBLICATIONS

Peter M. Kogge, "The Architecture of Pipelined Computers", 1981, pp. 222, 235, 273–278, and 284.

*Primary Examiner*—Eddie P. Chan
*Assistant Examiner*—Kevin L. Ellis
*Attorney, Agent, or Firm*—Whitham, Curtis, Whitham & McGinn; Anthony V. England

[57] ABSTRACT

An access hazard detection technique in a pipelined cache controller sustains high throughput in a frequently accessed cache but without the cost normally associated with such access hazard detection. If a previous request (request in the pipeline stages other than the first stage) has already resulted in a cache hit, and it matches the new request in both the Congruence Class Index and the Set Index fields and if the new request is also a hit, the address collision logic will signal a positive detection. This scheme makes use of the fact that (1) the hit condition, (2) the identical Congruence Class Index, and (3) the Set Index of two requests are sufficient to determine that they are referencing the same cache content. Implementation of this scheme results in a significant hardware saving and a significant performance boost.

2 Claims, 4 Drawing Sheets

HIGH PERFORMANCE/LOW COST ACCESS HAZARD DETECTION IN PIPELINED CACHE CONTROLLER USING COMPARATORS WITH A WIDTH SHORTER THAN AND INDEPENDENT OF TOTAL WIDTH OF MEMORY ADDRESS

BACKGROUND OF THE INVENTION

1. Field of the Invention

The present invention generally relates to high performance processors that use caches to enhance their performance and, more particularly, to a method of high performance hazard detection in a pipelined cache controller.

2. Description of the Prior Art

In high performance computers, caches serve to reduce the latency to memory. The cache provides a relatively small but very high performance memory very close to the processor. Data from the much larger but slower main memory is automatically staged into the cache by special hardware on a demand basis, typically in units of transfer called "lines" (ranging, for example, from 32 to 256 bytes). If the program running on the computer exhibits good locality of reference, most of the accesses by the processor are satisfied from the cache, and the average memory access time seen by the processor will be very close to that of the cache; e.g., on the order of one to two cycles. Only when the processor does not find the required data in the cache does it incur the "cache miss penalty", which is the longer latency to the main memory; e.g., on the order of twenty to forty cycles in computers with short cycle times. For a given cache structure, a program can be characterized by its "cache hit ratio" (CHR) which is the fraction of the accesses that are satisfied from the cache and hence do not suffer the longer latency to main memory.

Modern high performance processors are "pipelined" so that a complex, time-consuming function is performed as a series of simpler, shorter operations, each of which being executed with simultaneous computation on different sets of data. More advanced pipelined processors are implemented as several pipelines which may compute one or more functions. Such pipelined processors are characterized by a high throughput requiring frequent cache accesses. A pipelined cache controller is designed to sustain the high throughput required of such frequently accessed caches.

Access hazards exist in a pipelined cache controller for the following reasons: two requests at different pipeline stages can access the same cache line, and the cache-status-update occurs in a later pipeline stage (time) than the cache-status-read access. When two cache-memory requests accessing the same information are processed, hazard detection helps make sure that the second request accesses the cache line status that reflects any change produced by the first request. Without this safeguard, obsolete cache status may be accessed, and the system can get into an erroneous state. Access hazard detection in a pipelined n-way set-associative cache controller is very important to guarantee coherent data but it can be very costly to implement. For additional background on access hazard detection, see Peter M. Kogge, *The Architecture of Pipelined Computers*, Hemisphere Publishing Corp. (1981), particularly pp. 222, 235, 273–278, and 284.

Access hazard detection in a pipelined cache controller can be detected by comparing the full address for each new request to those of existing requests in each pipeline stage. For an N stage pipeline, N comparators with a length equal to the full address of the request are needed. Since the full address of modern high-performance computers is long, the comparator takes up considerable silicon real estate, and the time required to carry out the compare operation can dominate the cycle time, degrading performance.

Once an access hazard is detected, there are possible ways to resolve it. The methods to resolve access hazards are called hazard resolution. See pp. 222–225, of the book by Peter M. Kogge, supra. One simple solution is to reschedule the new request in the pipeline. Hopefully, the next time when it is processed by the pipelined controller, no request in the pipeline will access the same address. The second method is to stall the new request until any existing request which accesses the same content exits from the pipeline. By rescheduling or stalling the new request, the pipeline controller is not operating at its full capacity and performance is degraded. The third method will not cause performance degradation and deals with hazards in which the existing request reads from the addressed location. In this case, a special circuit is provided so that the result of the existing request will be sent to the new request. This technique is called short-circuiting See p. 224 of the book by Peter M. Kogge, supra. Short-circuiting requires detecting precisely that the two requests are accessing the same cache location.

An alternative to the conventional approach of full address comparison is to use less address bits for comparison. The output of such a comparison however is only a guess that the new request might be accessing the same cache memory location as an existing request. When this is detected, the new request must be rescheduled or stalled. A guess outcome leads to performance degradation because short-circuiting cannot be used to resolve the hazard. Because only partial addresses are used, the comparison will yield a match even when two different addresses are compared, provided of course that the partial addresses used themselves compare. If short-circuiting is used, the result of an operation may be used by a new request which accesses a different address, and computation errors will result. Partial address comparison will cause the new request to be rescheduled or stalled more frequently than when full address comparison is available.

SUMMARY OF THE INVENTION

It is therefore an object of the present invention to provide access hazard detection in a pipelined cache controller designed to sustain high throughput in a frequently accessed cache but without the cost normally associated with such access hazard detection.

It is another object of the invention to provide an access hazard detection scheme for use in a pipelined cache controller which can determine precisely whether two requests address the exact same cache location but with a minimum number of address bits for comparison.

According to the invention, a novel technique is used to provide access hazard detection in pipelined cache controllers. The technique uses comparators which have much shorter width, and the width of the comparator used is independent of the total width of the memory address. The approach results in a greater than 65% reduction in the comparator bits detecting access hazard when compared to using the full address bits and results in a substantial comparison time reduction (over 50%). The same techniques can be applied to any pipelined cache controller or memory controller.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
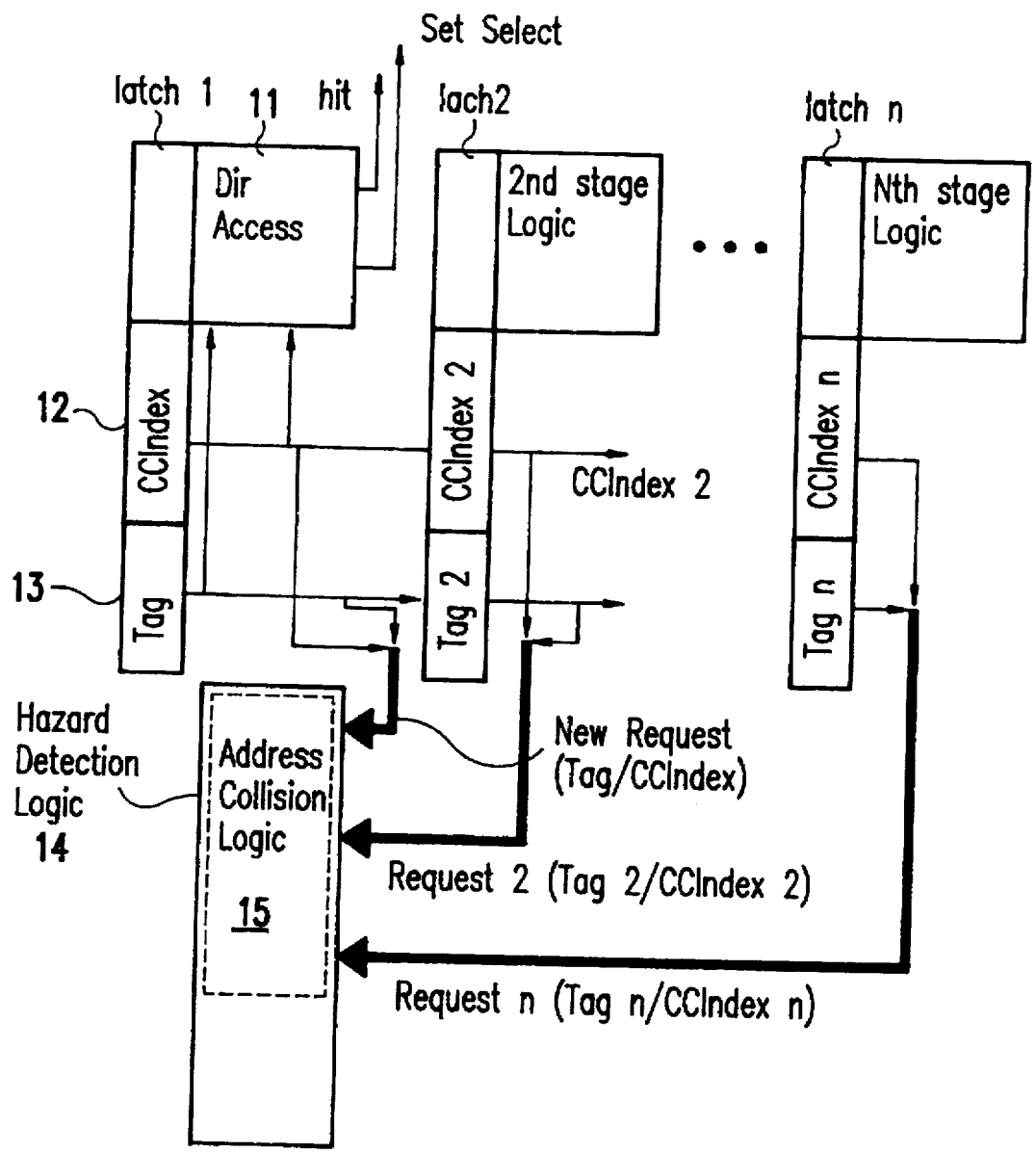
FIG. 1 is a block diagram showing a prior art approach to detecting access hazards in a pipelined cache.

Referring now to the drawings, and more particularly to FIG. 1, there is shown an example of a conventional approach used to detect access hazards in a pipelined cache controller. An N stage execution pipeline is assumed, each stage being isolated from the previous stage and from the next succeeding stage by boundary latches. Pipeline Stage 1 is assumed to contain the directory access logic 11 which includes a hit signal which indicates that a set contains the requested address and the set select signals generation logic which indicates the set that contains the requested address. The CCIndex (or Congruence Class Index) 12 is used in the first pipeline stage to access the directory, and the tag 13 is used to determine if the access is a hit or a miss on the congruence class addressed by CCIndex 12. The Set Index (set select or late select signal) is generated when there is a hit. A request is new when it arrives at stage 1. It advances to the second stage in the following cycle, to the third stage in the cycle after that, and so on.

It is also assumed that the hazard detection logic 14 is contained in Stage 1 of the execution pipeline where hazard detection is performed on the new incoming request against all requests further down in the pipeline. The core of the hazard detection logic contains the address collision logic 15 which detects whether the incoming request accesses the same memory location accessed by any request existing in the pipeline. In FIG. 1, the address of a new incoming request, comprised of a CCIndex (Congruence Class Index) and a Tag, are latched at the boundary latch of the first stage. As the request advances through the pipeline, the CCIndex and the Tag are latched at the boundary latches of each stage. From these latches, the CCIndexes and Tags are fed back to the address collision logic 15 to find an address matches.

Figure 2:
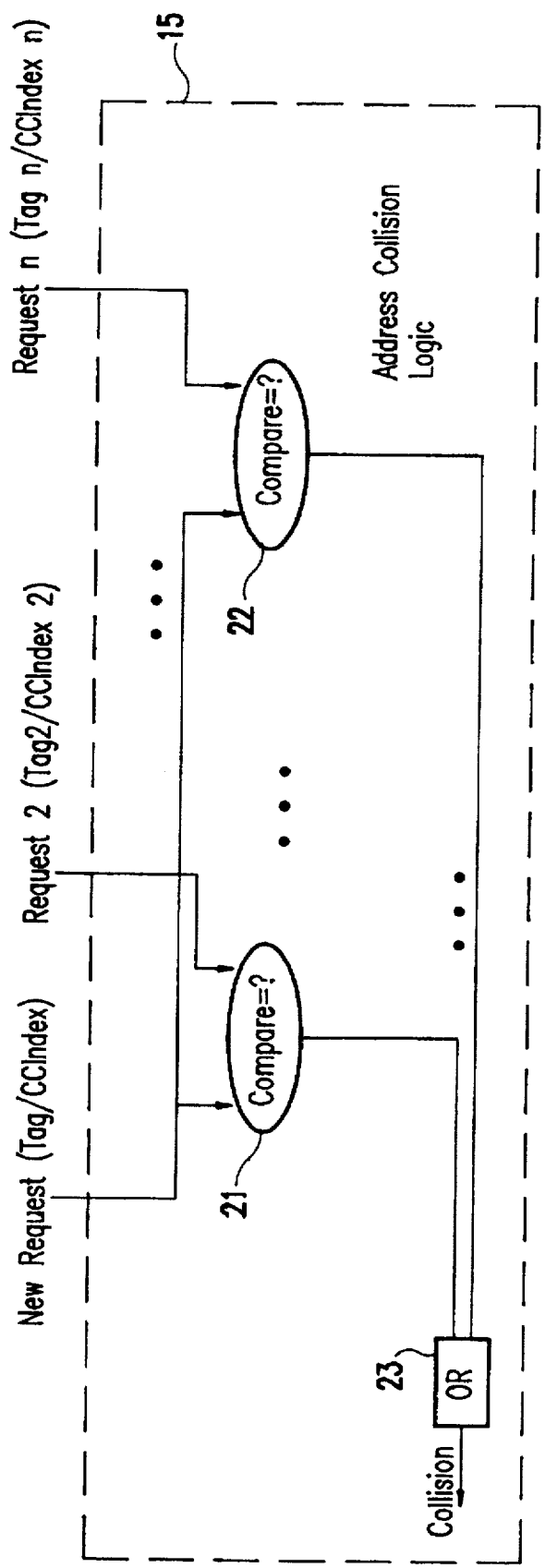
FIG. 2 is a logic diagram of the address collision logic for the access hazard detection system shown in FIG. 1.

The address collision logic 15 is shown in more detail in FIG. 2, to which reference is now made. This logic comprise a plurality of comparators 21 to 22, having their outputs connected to the detection OR gate 23. There is a comparator to compare the new request to the stages (Tag/CCIndex) with an old request for each other stage. Thus, for example, a three stage pipeline cache controller requires a comparator to compare the new request at Stage 1 with an existing request at Stage 2, a comparator to compare the new request from Stage 1 with an existing request at Stage 3. The comparators used in the address collision logic have a width equal to the sum of the CCIndex and the Tag.

The present invention uses only the CCIndex (a small portion of the full memory address) of the request, the hit and miss information of the request, and the Set Index to detect access hazard. For generality, a set associative cache design is assumed.

Figure 3:
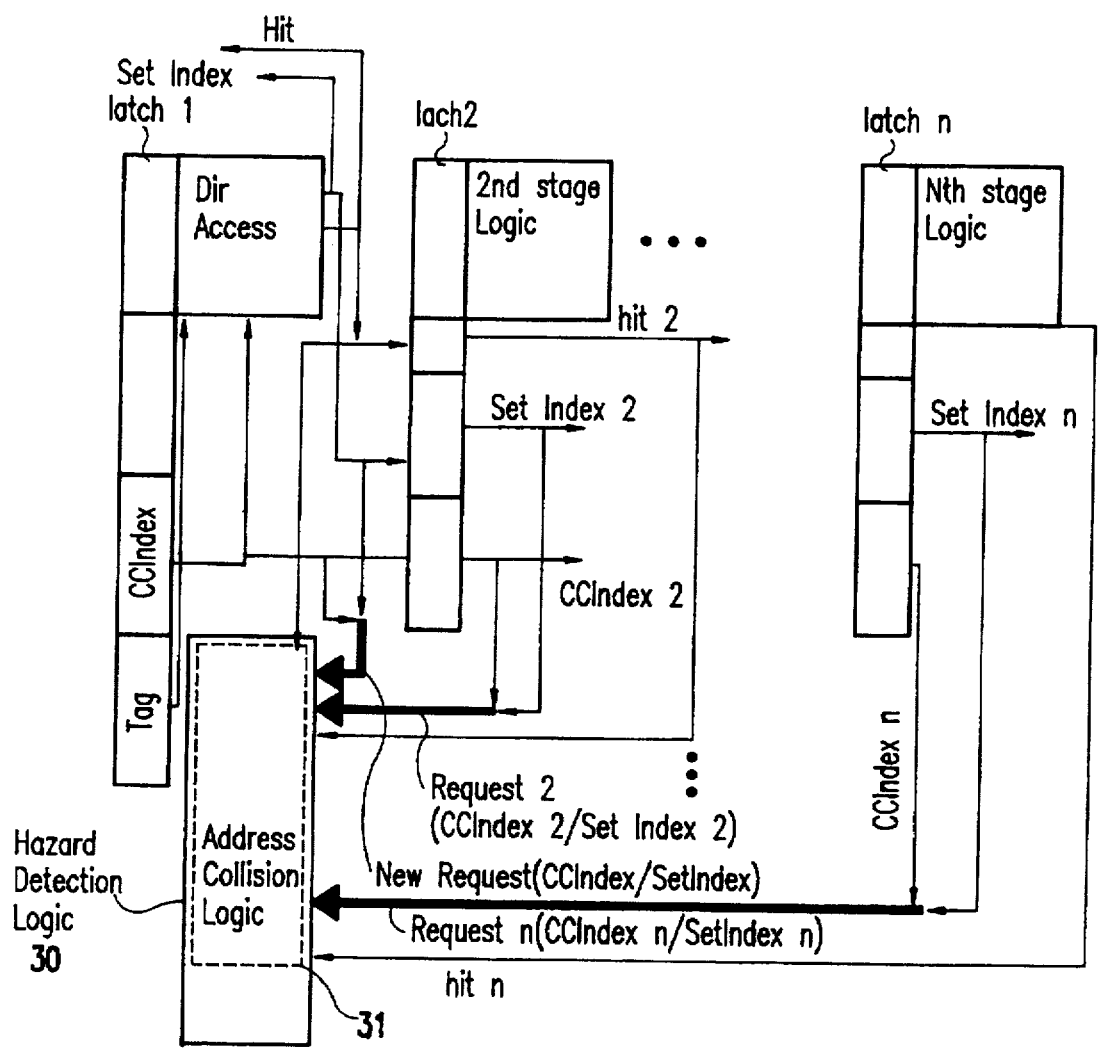
FIG. 3 is a block diagram showing the access hazard detection system according to the present invention.

FIG. 3 depicts the hazard detection system according to the present invention. Besides the CCIndex, the Hit signal and the Set Index signal are latched in latches in each of the subsequent pipeline stages as the request advances through the pipeline. When the request advances to a particular pipeline stage, its associated Hit signal, the CCIndex and the Set Index signal are fed and used in the hazard detection logic 30 which is comprised of the address collision logic 31 according to the invention. Notice that the Tag is no longer used for hazard detection.

Figure 4:
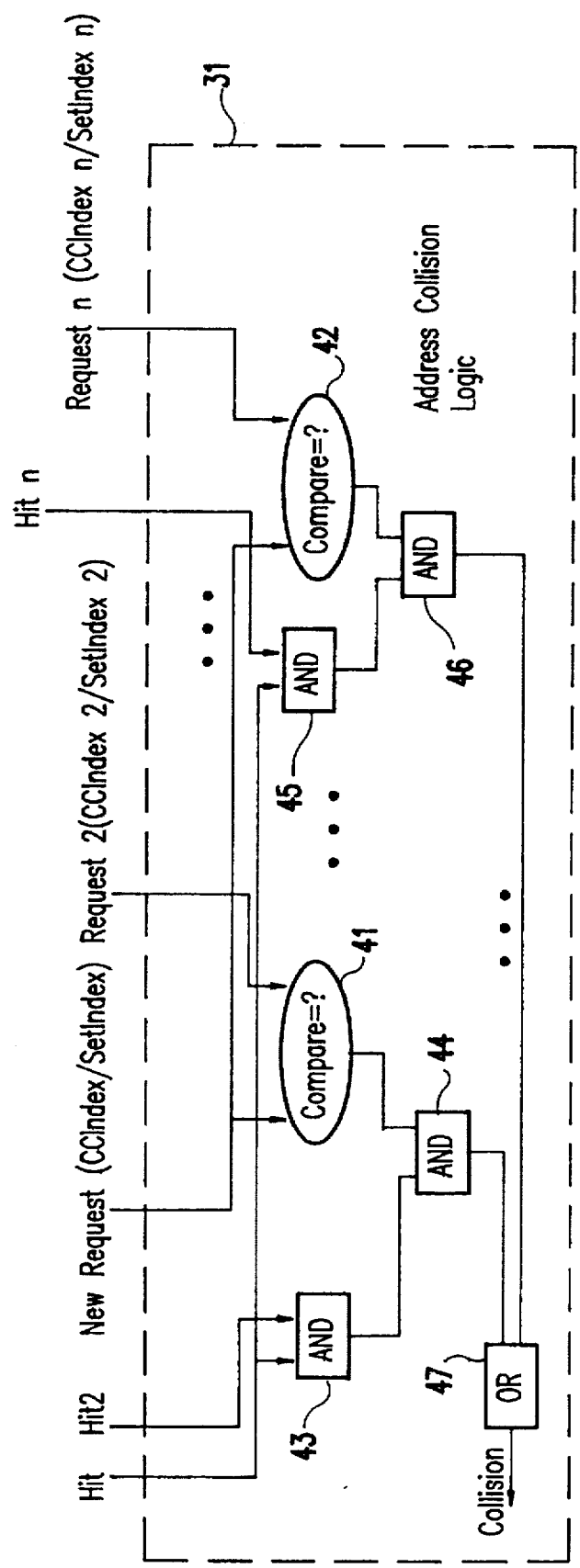
FIG. 4 is a logic diagram of the simplified address collision logic for the access hazard detection system shown in FIG. 3.

The address collision logic is shown in FIG. 4 and comprises a plurality of comparators 41 to 42 as before, but since these comparators only compare the new request against existing ones using only the CCIndex and the Set Index, they are much smaller than the comparators used in the conventional approach (since the Tag is no longer used). Augmenting the comparators 41 to 42 are a plurality of AND gates 43, 44 to 45, 46. For example, AND gate 43 receives as inputs signals representing a hit for Stage 1 and a hit for Stage 2. The output of AND gate 43 supplies one input to AND gate 44, the other input of which is supplied by comparator 41. Similar inputs are provided for AND gates 45 and 46, and the outputs of AND gates 44 and 46 are supplied to collision detection OR gate 47.

The key idea is that the address Tag is replaced in the conventional approach with the much smaller Set Index and a Hit signal. According to the present invention, if a previous request (request in the pipeline stages other than the first stage) has already resulted in a cache hit, and it matches the new request in both the Congruence Class Index and the Set Index fields, and if the new request is also a hit, the address collision logic will signal a positive detection. This scheme makes use of the fact that (1) the hit condition, (2) the identical Congruence Class Index, and (3) the Set Index of two requests are sufficient to determine that they are referencing the same cache content.

The width of the comparators 41 to 42 required to check the address collision condition is equal to Width [CClassIndex]+Width[Set Index], compared to Width [CCIndex]+Width[the width address Tag] in the conventional approach. The width of the address Tag is much larger than the width of the Set Index in cache design of modern day computers. For a 48-bit real address with 256 byte line, and 4096 congruence class, the CCIndex is 12 bits wide, and the Tag is 28 bits wide. Assuming a four way set associative cache, the Set Index is only 2 bits wide. The new approach thus uses only 14-bit comparators while the conventional approach uses 40-bit comparators for this example. The saving of comparator width is 65%, and the comparator time saving is over 50%. The saving of time is critical because the address collision logic can dominate the pipeline stage cycle time. This invention results in significant time and space improvement in access hazard detection in pipeline cache/memory controller design.

In summary, when the incoming request is a miss, the CCIndex can be matched with any request in the execution pipeline to stall or to reschedule the incoming request. This is required to allow the set replacement algorithm to select the appropriate set based on the proper reference history. On the other hand, when the incoming request is a hit, the invention allows for the detection of when the new request is accessing exactly the same address of a previous request, but without the overhead required in the prior art to accomplish the same result; that is, the invention uses much less address bits for comparison to detect whether two hit requests address the exact same location. This allows an efficient cache control in a pipelined processor by permitting short-circuiting.

While the invention has been described in terms of a single preferred embodiment for a single level of cache, those skilled in the art will recognize that the invention can be practiced with modification for multiple levels of cache within the spirit and scope of the appended claims.

Having thus described our invention, what we claim as new and desire to secure by Letters Patent is as follows:

1. A pipelined cache controller for a set associative cache of a high performance computer comprising:

a plurality of pipeline stages, each stage being isolated from a previous stage and a succeeding stage by boundary latches and having directory access logic storing a hit signal indicating that a set contains a requested address and a set select signal indicating the set that contains a requested address;

a Congruence Class Index (CCIndex) field used to access the directory;

a tag field used to determine if the access is a hit or a miss on the congruence class addressed by the CCIndex, the CCIndex, the hit signal and the set index being latched in the boundary latches in each of the subsequent pipeline stages as a request advances through the pipeline stages; and hazard detection logic receiving an associated hit signal, a CCIndex and a set index from the boundary latches when a request advances to a particular pipeline stage, the hazard detection logic comprising a plurality of comparators to compare a new request to stages with an old request for each other stage, the comparators comparing the new request against existing requests using only the CCIndex and the set index fields, a first plurality of AND gates enabled by a hit for a first stage and respectively responsive to hits from corresponding subsequent stages to provide outputs, a second plurality of AND gates receiving as one input the output of a corresponding one of the first plurality of AND gates and as a second input an output of a corresponding one of the comparators, whereby if a previous request has already resulted in a cache hit and it matches a new request in both the CCIndex and the set index fields and if the new request is also a hit, the address collision logic will signal a positive detection.

2. The pipelined cache controller recited in claim 1 wherein a cache line is 256 bytes with a 48-bit real address and a 4096 congruence class, and an address Tag of 28 bits width, said Congruence Class Index being 12 bits wide and, for a four way set associative cache, the Set Index is 2 bits wide.

* * * * *